(12) United States Patent
Jen et al.

(10) Patent No.: US 9,072,025 B2
(45) Date of Patent: Jun. 30, 2015

(54) METHOD OF MEASUREMENT REPORTING AND RELATED COMMUNICATION DEVICE

(75) Inventors: Yu-Chih Jen, Taoyuan County (TW); Te-Ming Chen, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 540 days.

(21) Appl. No.: 12/725,473

(22) Filed: Mar. 17, 2010

(65) Prior Publication Data

US 2010/0240358 A1   Sep. 23, 2010

Related U.S. Application Data

(60) Provisional application No. 61/161,769, filed on Mar. 20, 2009.

(51) Int. Cl.
*H04W 24/00* (2009.01)
*H04W 36/38* (2009.01)

(52) U.S. Cl.
CPC .................................. *H04W 36/385* (2013.01)

(58) Field of Classification Search
CPC .................................................. H04W 36/385
USPC ................. 455/575.4, 424, 436; 379/433.12, 379/433.13
See application file for complete search history.

(56) References Cited

U.S. PATENT DOCUMENTS

| | | | |
|---|---|---|---|
| 2008/0227447 A1* | 9/2008 | Jeong et al. | 455/434 |
| 2008/0267153 A1 | 10/2008 | Mukherjee | |
| 2009/0047960 A1* | 2/2009 | Gunnarsson et al. | 455/436 |
| 2009/0047968 A1 | 2/2009 | Gunnarsson | |
| 2010/0075681 A1* | 3/2010 | Olofsson et al. | 455/436 |
| 2010/0240367 A1* | 9/2010 | Lee et al. | 455/435.2 |
| 2010/0298017 A1* | 11/2010 | Dalsgaard et al. | 455/507 |

FOREIGN PATENT DOCUMENTS

| | | |
|---|---|---|
| CN | 101217792 A | 7/2008 |
| CN | 101616408 A | 12/2009 |
| CN | 101651881 A | 2/2010 |
| JP | 2010109664 A | 5/2010 |
| JP | 2010109665 A | 5/2010 |
| JP | 2010537480 A | 12/2010 |
| KR | 1020040093994 A | 11/2004 |
| KR | 1020100075941 A | 7/2010 |
| WO | 2009022976 A1 | 2/2009 |
| WO | 2010050140 A1 | 5/2010 |

OTHER PUBLICATIONS

3GPP TS 36.331 v8.5.0 3rd Generation Partnership Project; Technical Specification Group Radio Access Network; Evolved Universal Terrestrial Radio Access (E-UTRA) Radio Resource Control (RRC); Protocol specification (Release 8), Mar. 2009.

(Continued)

*Primary Examiner* — Phuoc H Doan
(74) *Attorney, Agent, or Firm* — Winston Hsu; Scott Margo (57) ABSTRACT

A method of measurement reporting for a mobile device in a wireless communication system is disclosed. The method comprises the steps of including a first indicator associated with a first cell in a measurement report and sending the measurement report to a network entity of the wireless communication system. The first indicator informs the network entity about accessibility information of the first cell corresponding to the mobile device.

6 Claims, 6 Drawing Sheets

(56) References Cited

OTHER PUBLICATIONS

3GPP TSG-RAN WG2 Meeting #66 R2-092798, "MBMS baseline for Rel-9", May 4, 2009.

Telecom Italia, Qualcomm Europe, Samsung: "Way forward for handover to HeNB", 3GPP TSG-RAN WG2 Meeting #63, R2-084534, Aug. 18-22, 2008, XP050319573, Jeju, Korea.

Qualcomm Europe: "Optimized handover in the presence of PCI confusion", 3GPP TSG RAN WG2 62bis, R2-083268, Jun. 30-Jul. 4, 2008, pp. 1-5, XP050140688, Warsaw, Poland.

Motorola: "Identification and Measurement of CSG cells", 3GPP TSG-RAN WG2#61, R2-081114, Feb. 11-15, 2008, pp. 1/2-2/2, XP050138898, Sorrento, Italy.

Office Action mailed on Apr. 12, 2013 for the Korean Application No. 10-2012-0034052, filing date Apr. 2, 2012, pp. 1-4.

Notice of allowance mailed on Dec. 13, 2013 for the Korean Application No. 10-2012-0034052, filed Apr. 2, 2012, pp. 1-2.

* cited by examiner

METHOD OF MEASUREMENT REPORTING AND RELATED COMMUNICATION DEVICE

CROSS REFERENCE TO RELATED APPLICATIONS

This application claims the benefit of U.S. Provisional Application No. 61/161,769, filed on Mar. 20, 2009 and entitled "Performance enhancement according to measurement procedure" the contents of which are incorporated herein.

BACKGROUND OF THE INVENTION

1. Field of the Invention

A method used in a wireless communication system and related communication device are disclosed, and more particularly to, a method of measurement reporting for a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In LTE system, the UE is operated in two RRC modes, RRC_IDLE mode and RRC_CONNECTED mode. The UE is in the RRC_CONNECTED mode when an RRC connection has been established. If no RRC connection is established, the UE is in the RRC_IDLE mode. The RRC_IDLE mode mobility is based on UE autonomous cell reselections according to the parameters provided by the network. In the RRC_CONNECTED mode, the network controls UE mobility, i.e. the network decides when the UE shall move to which cell (which may be on another frequency or RAT). A handover procedure is the only procedure used for network to control mobility of the UE in the RRC_CONNECTED mode. The network triggers the handover procedure based on radio conditions. To facilitate the handover procedure, the network may configure the UE to perform measurement reporting. The measurement report may include different types of measurements (as described below) to provide information of all radio conditions for the network. Thus, the network may decide when the handover procedure should take place.

To obtain the measurements from the UE, the network (e.g. E-UTRAN) must first send a measurement control message to the UE. The measurement control message includes several information elements (IEs) relating to what kind of measurement procedure should be performed. For example, an IE "measurement command" can have the value of "set up", "modify" or "release", and the IE "measurement type" specifies the types of measurement(s) the network wants the UE to perform. The UE measurements can be categorized into seven types as below: (1) Intra-frequency measurements; (2) Inter-frequency measurements; (3) Inter-RAT measurements; (4) UE positioning measurements; (5) Traffic volume measurements (TVM); (6) Quality measurements; (7) UE internal measurements. After the UE obtains various measurement results from lower layers (e.g. a media access control layer or a physical layer), and generates a measurement report from the various measurement results, the measurement report is sent to the RRC layer of a network.

In the LTE system, a small coverage base station (e.g. home base station or Home NodeB) may be deployed for magnificent advantages, such as the high bandwidth wireless internet access in the home and office, and efficient and cost-effective capacity solution for indoor coverage. Typically, such small-coverage base stations are connected to the Internet and the mobile operator's network via broad band equipments (e.g. a DSL router or a cable modem). The small coverage base station may provide restricted access to only UEs belonging to a Closed Subscriber Group (CSG) and usually serve several CSG cells. The CSG cell is accessible by a limited set of UEs of the closed subscriber group.

On the other hand, the UE uses physical cell identifies (PCIs) to identify cells. The number of available PCIs is limited compared to the number of cells in a system (e.g. there are only 504 different PCIs in the LTE system). Basically, the network needs to handle the non-unique PCIs of cells to support efficient measurement and reporting procedures. For example, in the LTE system, the UE is required to measure a reference signal received power (RSRP) (i.e. the received power of the signature sequence symbols associated with a particular PCI) of candidate cells and report to the serving cell (the cell serving the UE at the moment). However, problems may occur when multiple cells, for example the aforementioned CSG cells, are assigned to the same PCI, and the UE includes one or more cells with the same PCI in the measurement report. In this situation, the network is confused by the PCI retrieved from the measurement report and cannot understand which cell the PCI refers to (This is referred as to PCI confusion). If the cell quality (e.g. measurement quantity information elements) reported in the measurement report shows that the cell is suitable for handover, the network may direct the UE to that cell which may not be accessed by the UE and even not be detected actually since the network does not know exactly which cell could possibly be the one due to the same PCI. In other words, from the measurement report received from the UE, the network is not able to determine a correct target cell for the UE to handover. On the other hand, a serving base station of the UE may not be aware of the CSG cell of a home base station so that the serving base station could not recognize the PCI of the CSG cell in the measurement report.

SUMMARY OF THE INVENTION

A method of measurement report for a mobile device in a wireless communication system is disclosed to avoid the aforementioned problem caused by physical cell identity (PCI) confusion.

A method of measurement reporting for a mobile device in a wireless communication system is disclosed. The method of measurement reporting comprises the steps of including a first indicator associated with a first cell in a measurement report; and sending the measurement report to a network entity of the wireless communication system. The first indicator informs the network entity about accessibility information of the first cell corresponding to the mobile device.

A method of handling measurement reporting for a network entity in a wireless communication system is disclosed. The method of handling measurement reporting comprises the steps of receiving a measurement report comprising a first indicator from a mobile device of the wireless communication system, and distinguishing a first cell from a second cell according to the first indicator, wherein the first cell and the second cell have the same identity, e.g., physical cell identity (PCI).

A communication device of a wireless communication system for measurement reporting is disclosed. The communication device includes means for including a first indicator associated with a first cell in a measurement report; and means for sending the measurement report to a network entity of the wireless communication system. The first indicator informs the network entity about accessibility information of the first cell corresponding to the communication device.

A communication device of a wireless communication system for handling measurement reporting is disclosed. The communication device comprises means for receiving a measurement report comprising a first indicator from a mobile device of the wireless communication system; and means for distinguishing a first cell from a second cell according to the first indicator, wherein the first cell and the second cell has the same identity, e.g., physical cell identity.

These and other objectives will no doubt become obvious to those of ordinary skill in the art after reading the following detailed description of the preferred embodiment that is illustrated in the various figures and drawings.

DETAILED DESCRIPTION

Figure 1:
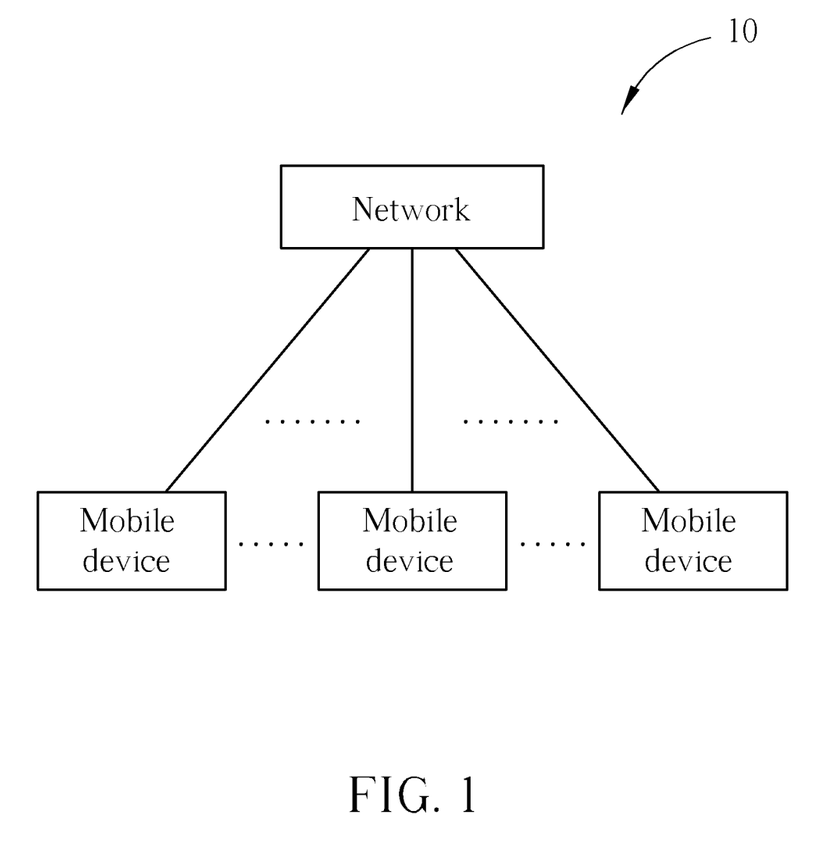
FIG. 1 illustrates a schematic diagram of an exemplary wireless communication system.

Please refer to FIG. 1, which illustrates a schematic diagram of a wireless communication system 10 according to an example. Briefly, the wireless communication system 10 is composed of a network and a plurality of mobile devices. The wireless communication system 10 can be a UMTS (Universal Mobile Telecommunications System), an LTE (long-term evolution) system or any other similar network system. In the LTE system, the network can be referred as a EUTRAN (evolved-UTRAN) comprising a plurality of eNBs or a core network entity (e.g. Mobility Management Entity called MME), whereas the mobile devices are referred as to user equipments (UEs). The UEs can be devices such as mobile phones, computer systems, etc. This terminology will be used throughout the application for ease of reference, however, this should not be construed as limiting the invention to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
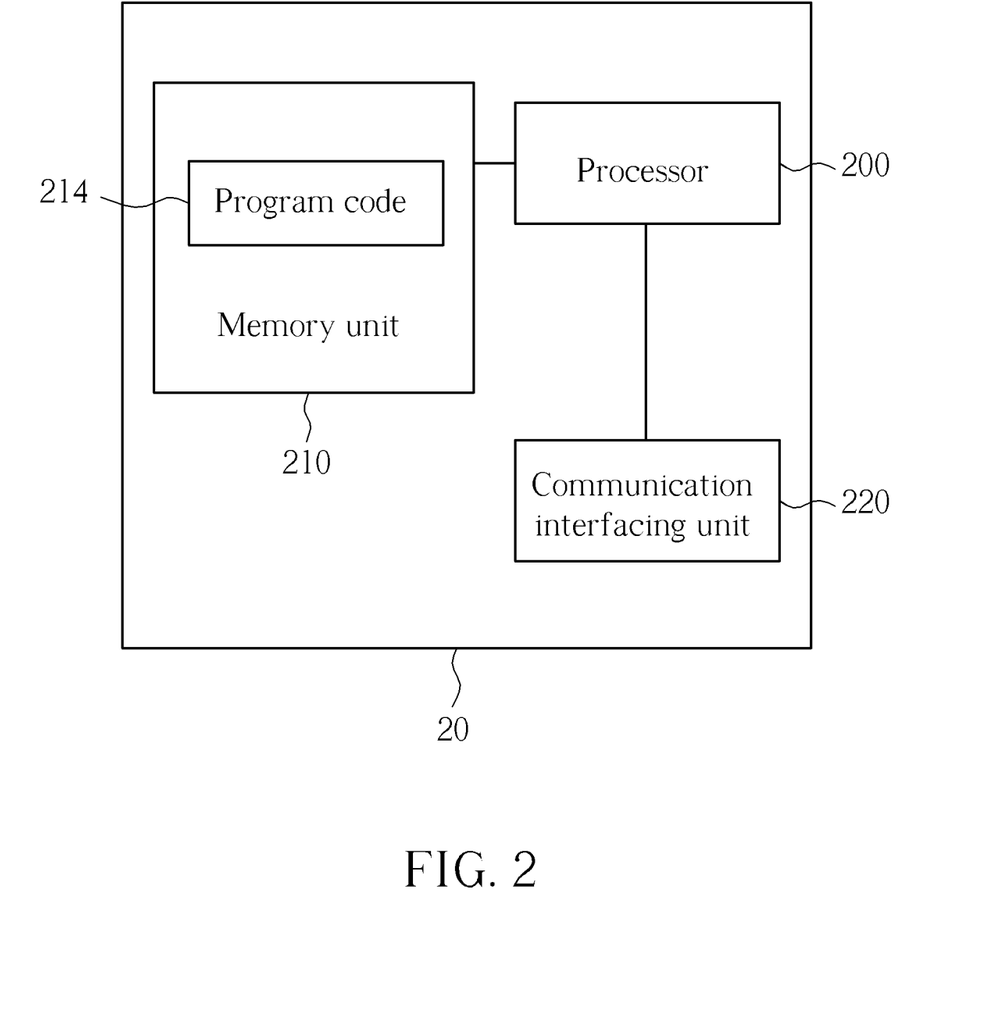
FIG. 2 illustrates a schematic diagram of an exemplary communication device.

Please refer to FIG. 2, which illustrates a schematic diagram of a communication device 20 according to an example. The communication device 20 may be the mobile devices or the network shown in FIG. 1 and may include a processor 200 such as a microprocessor or ASIC, a memory unit 210 and a communication interfacing unit 220. The memory unit 210 may be any data storage device that can store program code 214 for access by the processor 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 may be preferably a radio transceiver and accordingly exchanges wireless signals according to processing results of the processor 200.

Figure 3:
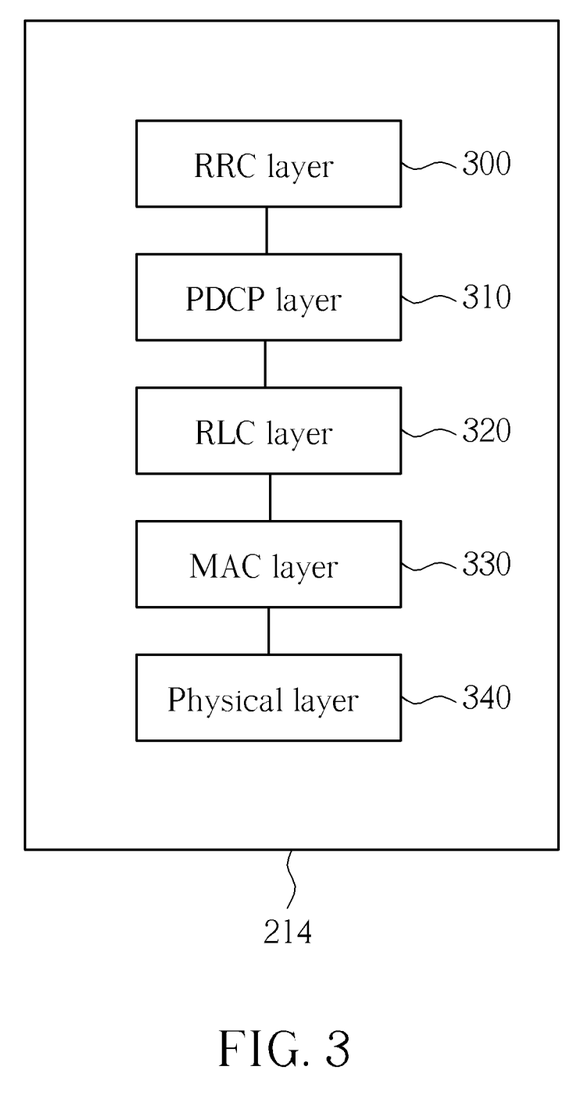
FIG. 3 illustrates a schematic diagram of exemplary program code.

Please refer to FIG. 3, which illustrates a schematic diagram of the program code 214 for the LTE system according to an example. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. When the communication device 20 is referred as to the mobile device shown in FIG. 1, the RRC layer 300 of the communication device 20 obtains various measurement results from the MAC layer 330 and the physical layer 340. Then, the RRC layer 300 generates a measurement report based on the measurement results. The measurement report is sent to the network (e.g. E-UTRAN) via a "MeasurementReport" message for reporting the communication system environment situation around the communication device 20, e.g., communication quality of one or more cells around the communication device 20. The communication device 20 may set measurement information elements (e.g. MeasResults) within the MeasurementReport message. When the communication device 20 is referred as to the network shown in FIG. 1, the RRC layer 300 of the network may provide the measurement configuration applicable for the UE by sending dedicated signalling, e.g., the RRCConnectionReconfiguration message.

Figure 4:
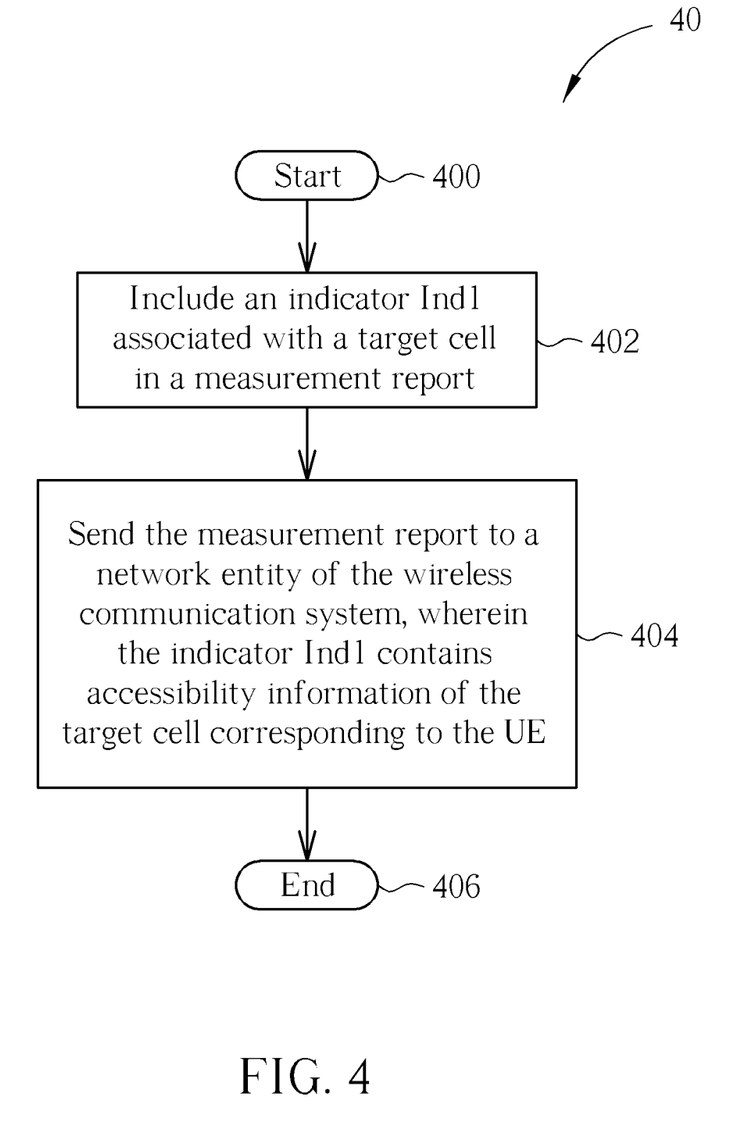
FIG. 4 is a flow chat of an exemplary process for a user equipment in a wireless communication system.

Please refer to FIG. 4, which is a flowchart of a process 40 according to an example. The process 40 is used for measurement reporting for a UE in a wireless communication system. The process 40 may be compiled into the program code 214 and include the following steps:

Step 400: Start.

Step 402: Include an indicator Ind1 associated with a target cell in a measurement report.

Step 404: Send the measurement report to a network entity of the wireless communication system, wherein the indicator Ind1 contains accessibility information of the target cell corresponding to the UE.

Step 406: End.

According to the process 40, the UE includes the indicator Ind1 in the measurement report. The indicator Ind1 is associated with the target cell which the quality is good enough to report, e.g., according to the threshold provided by the network. The target cell may be a closed subscriber group (CSG) cell on a CSG white list of the UE. The CSG white list indicates a list of CSG cells to which the UE, as a member of the CSG cells, can access. The CSG white list may be provided by an upper layer (e.g. a Non Access Stratum (NAS) layer). The indicator Ind1 may be a member field of at least one bit, which contains accessibility information of the target cell. For example, the member field generated based on CSG white list may indicate whether the UE is a member of the target cell or not. In the next step, the UE sends the measurement report to the network entity. In other words, according to the member field included in the measurement report sent by the UE, the network entity could be informed of the accessibility information of the target cell (e.g. whether the target cell can be accessed by the UE or not).

According to the measurement report received from the UE, the network entity may determine whether a handover procedure should take place. To be more specific, the network may direct the UE from a serving cell to the target cell according to the indicator Ind1 included in the measurement report. In some examples, after the UE receives a directing command from the network, the network may direct the UE from the serving cell to the target cell according to the indicator Ind1. In some examples, the network may direct UE from the serving cell to the target cell according to the indicator Ind1 as well as cell quality (e.g. measurement quantity information element), or only depending on the cell quality.

Therefore, by sending the measurement report with the indicator Ind1 included in, the UE may inform the network of the accessibility information of the target cell. According to the indicator Ind1, the network may determine whether the target cell is suitable for the handover. In some examples, the home base station may be deployed in the home and office, and the coverage of the home base station may be covered by multiple closed subscriber group (CSG) cells. The target cell may be one of the CSG cells, which are assigned to the same PCI by the network. Under this circumstance, even if the target and the other CSG cells have the same PCI, before triggering the handover procedure, the network can exactly know whether the target cell is accessible or whether the UE can access the target cell, according to the indicator Ind1 associated with the target cell. This resolves the ambiguity of the identity when the same PCI is assigned to the multiple cells.

Figure 5:
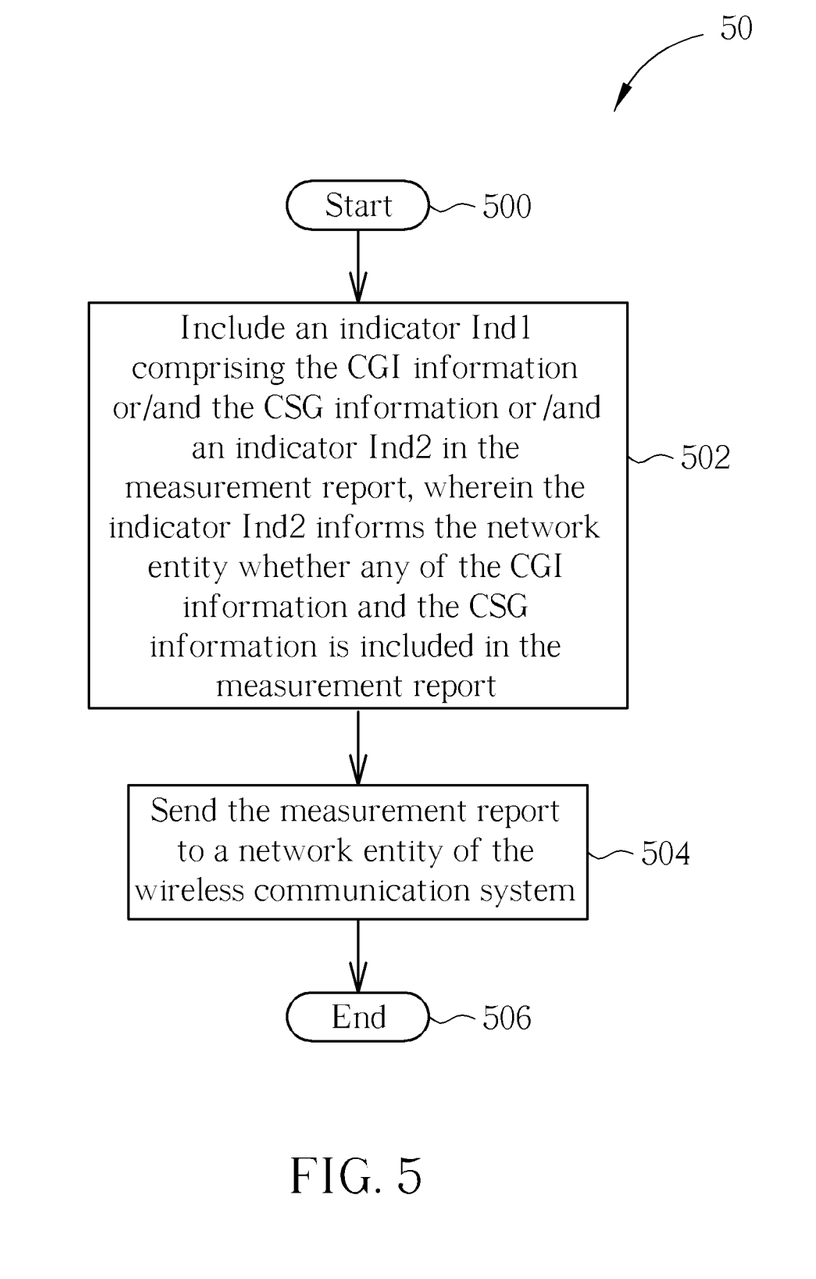
FIG. 5 is a flow chat of an exemplary process for a user equipment in a wireless communication system.

Instead of being the member field, the indicator Ind1 may include cell global identifier (CGI) information or closed subscriber group (CSG) information or both. In this situation, a flowchart of a process 50 is provided in FIG. 5, for measurement reporting for a UE in a wireless communication system. The process 50 may be compiled into the program code 214 and include the following steps:

Step 500: Start.

Step 502: Include an indicator Ind1 comprising the CGI information or/and the CSG information or/and an indicator Ind2 in the measurement report, wherein the indicator Ind2 informs the network entity whether any of the CGI information and the CSG information is included in the measurement report.

Step 504: Send the measurement report to a network entity of the wireless communication system.

Step 506: End.

According to the process 50, the UE may include the CGI information or/and the CSG information or/and the indicator Ind2 in the measurement report. Then, the UE may send the measurement report to the network entity of the wireless communication system. In some examples, the UE may use the indicator Ind2 to inform the network entity whether the CGI information or the CSG information, or both are included in the measurement report. In other words, the UE includes at least one of the followings in the measurement report: the indicator Ind2, CGI information, and CSG information. Preferably, the CSG information is referred as to a CSG identity, and the CGI information is referred as to a cell global identifier. Therefore, the measurement report sent by the UE may include the indicator Ind2 or/and CGI information or/and CSG information associated with the target cell.

Taking an example, a UE X belongs to a CSG group and is permitted to access a CSG cell C1 served by a home base station. Meanwhile, there exists another CSG cell C2 (the UE X may/may not be within its coverage) served by another home base station, which does not provide service to the UE X. However, due to the shortage of PCI, the CSG cells C1 and C2 may be assigned the same PCI P1. The signal quality of CSG cell C1 is good enough to report, e.g. according to the threshold provided by the network. In this situation, the UE X may send a measurement report to the network. The measurement report includes a member field M1 of one bit and the member field M1 indicates that the UE X is a member of the CSG cell C1 according to a CSG white list provided from a NAS layer of the UE X. After receiving the measurement report, the network may read the member field M1 and consider that the CSG cell C1 is accessible by the UE X. Then, the network may direct the UE X from the serving cell to the CSG cell C1 if the signal quality of the CSG cell C1 is good. In some examples, the UE may also include the member field M2 associated with the CSG cell C2 in the measurement report. However, the member field M2 indicates that the UE is not a member of the CSG cells C2. Thus, after reading the member field M2, the network realize that it is not suitable for the UE X to handover to the CSG cell C2. The UE X may avoid handover to an inaccessible CSG cell, i.e. C2. Consequently, according to the member fields included in the measurement report, the network may know which CSG cell is accessible by the UE and direct the UE to the accessible CSG cell without any confusion due to the same PCI.

Figure 6:
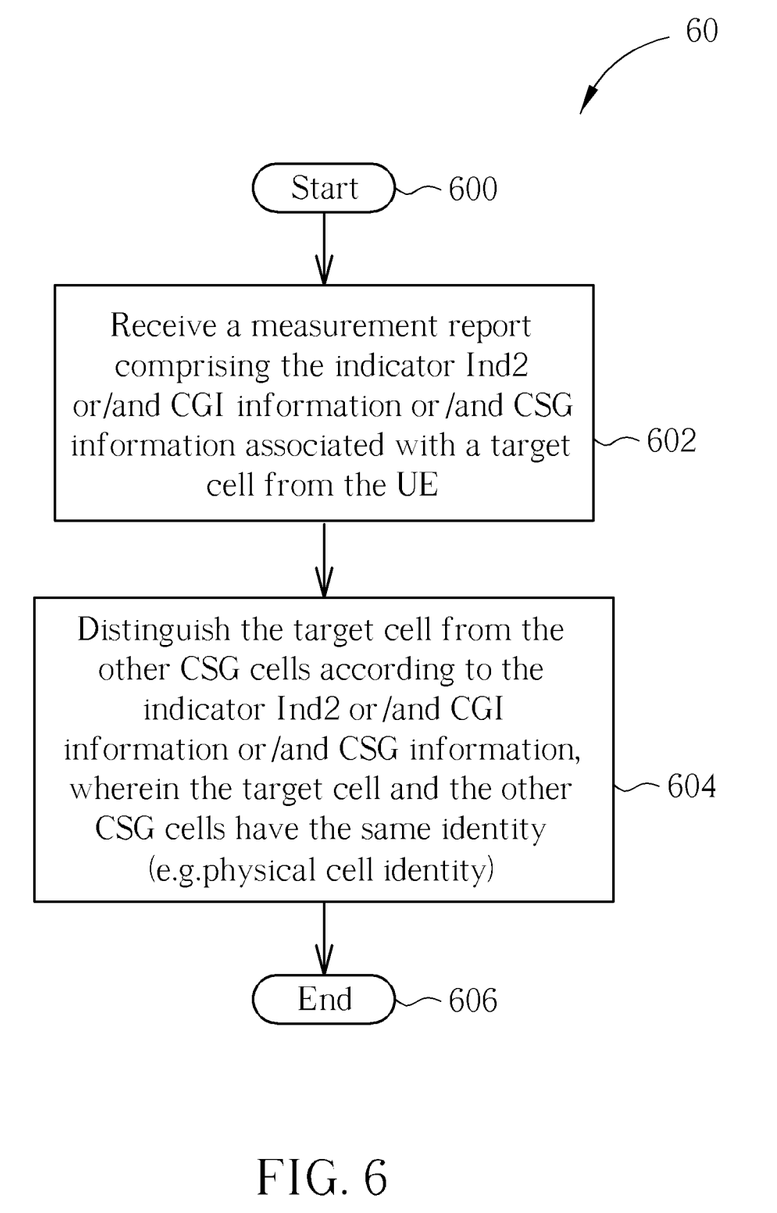
FIG. 6 is a flow chat of an exemplary process for a network entity in a wireless communication system.

Based on the process 50, the network may take corresponding actions. Please refer to FIG. 6, which is a flowchart of a process 60 according to an example of the present disclosure. The process 60 is used for handling measurement reporting for a network entity in a wireless communication system. The process 60 may be compiled into the program code 214 and include the following steps:

Step 600: Start.

Step 602: Receive a measurement report comprising the indicator Ind2 or/and CGI information or/and CSG information associated with a target cell from the UE.

Step 604: Distinguish the target cell from the other CSG cells according to the indicator Ind2 or/and CGI information or/and CSG information, wherein the target cell and the other CSG cells have the same identity, e.g., physical cell identity.

Step 606: End.

According to the process 60, the network entity receives the measurement report from the UE. The measurement report includes the indicator Ind2 or/and CGI information or/and CSG information associated with the target cell. According to the indicator Ind2 or/and CGI information or/and CSG information, the network entity may distinguish the target cell from the other CSG cells when the same PCI is assigned to the target cell and the CSG others. The indicator Ind2 may be used for indicating whether the CGI information or the CSG information or both are included in the measurement report. Therefore, by receiving the measurement report, the network may distinguish the target cell from the other CSG cells.

Besides, the network entity may determine accessibility of the target cell (i.e. determining whether a UE can access the target cell or the target cell can be accessed by a UE) according to the CGI information or the CSG information or both. If the target cell is accessible by the UE, the network entity may direct the UE from a serving cell to the target cell. In some examples, the network may direct the UE to the target cell according to the accessibility of the target cell as well as the cell quality. In some examples, the network may direct the UE to the target cell according to the cell quality only. Or the network may direct the UE to the target cell regardless of the measurement report and any information (e.g. CGI information, CSG information) included in the measurement report.

Thus, when the multiple cells are assigned the same PCI, the network may be informed of whether the CGI information or/and the CSG information is included in the measurement report through the indicator Ind2. Then, the network entity may distinguish the target cell from the other CSG cells which have the same PCI, as well as determine the accessibility of the target cell, according to the CGI information or the CSG information or both. If the target cell is accessible by the UE, the network entity may direct the UE to the target cell. Consequently, this prevents the network entity from directing the UE to the cell which is not allowed to be accessed by the UE due to PCI confusion.

In an example, the network assigns the same PCI to CSG cells D1 and D2. A UE may include an indicator IND1 and/or a cell global identifier CGI_1 and/or a CSG identity CSGid_1 in the measurement report. The indicator IND1 may be referred as to the aforementioned indicator ind2. The cell global identifier CGI_1 may be referred as to the aforementioned CGI information. The CSG identity CSGid_1 may be referred as to the aforementioned CSG information. The indicator IND1, the cell global identifier CGI_1 and the CSG identity CSGid_1 are associated with the CSG cell D1. In some examples, the indicator IND1 is used for indicating whether the cell global identifier CGI_1 and/or the CSG identity CSGid_1 is/are included in the measurement report. After receiving the measurement report, the network may distinguish the CSG cell D1 from the CSG cell D2 according to the indicator IND1 and/or the cell global identifier CGI_1 and/or CSG identity CSGid_1 and thus no more be confused by the PCI assigned to the CSG cells D1 and D2 both. Further, the network may consider the CSG cell D1 is accessible by the UE according to the indicator IND1 and/or the cell global identifier CGI_1 and/or CSG identity CSGid_1 and may direct the UE from the serving cell to the CSG cell D1 if the signal quality of the CSG cell D1 is good.

As can be seen from the above, with the cell identity-type or accessibility information provided by the measurement report of the UE, the network can be assisted to determine the cell for the UE to handover to, based on the PCI which is possibly owned by more than one cell. Thus, handover to a wrong cell due to the same PCI problem can be avoided.

To sum up, under a certain circumstance (e.g. the target cell and the other cells have the same PCI), the UE may include the indicators (e.g. member field, CGI information or CSI information) which are associated with the target cell in the measurement report. Based on the measurement report sent by the UE, the network can determine whether the target cell is accessible by the UE. If the target cell is accessible, the network may direct the UE to the target cell or take any other actions. Such that the examples of the present disclosure can solve the problem caused by the PCI confusion, for example, the network directing the UE to the inaccessible cell.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of measurement reporting for a mobile device in a wireless communication system, the method comprising:
    including a cell global identifier associated with a first cell, a member field and a close subscriber group (CSG) identity associated with the first cell in a measurement report, wherein the measurement report is related to the first cell identified by a physical cell identifier (PCI); and
    sending the measurement report to a network entity of the wireless communication system;
    wherein the member field indicates whether the mobile device is a member of the first cell.

2. The method of claim 1 further comprising moving from a second cell to the first cell based on a directing command received from the network entity, wherein the directing command is generated by the network entity according to the CSG identity or cell quality or both of the CSG identity and the cell quality.

3. A method of handling measurement reporting for a network entity in a wireless communication system, the method comprising:
    the network entity receiving a measurement report comprising a cell global identifier associated with a first cell, a member field and a close subscriber group (CSG) identity associated with the first cell from a mobile device in the wireless communication system, wherein the measurement report is related to the first cell identified by a physical cell identifier (PCI) and the member field indicates whether the mobile device is a member of the first cell,
    wherein the measurement report is sent from the mobile device.

4. The method of claim 3 further comprising determining accessibility of the first cell according to the CSG identity.

5. The method of claim 4 further comprising directing the mobile device from a second cell to the first cell according to the accessibility of the first cell or cell quality or both of the accessibility of the first cell and the cell quality.

6. The method of claim 3 further comprising:
    ignoring the measurement report; and
    directing the mobile device from a second cell to the first cell.

* * * * *